Figure 1:
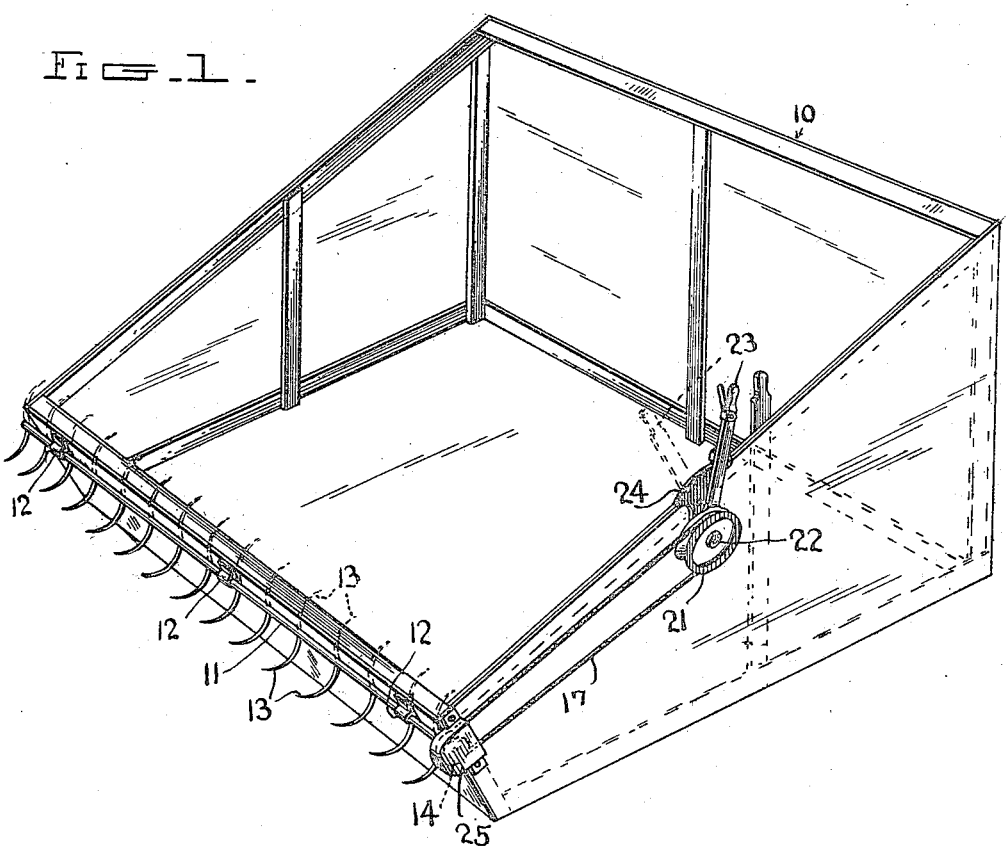

I. L. WORDEN.
HEADER BARGE ATTACHMENT.
APPLICATION FILED APR. 9, 1915.

1,168,366. Patented Jan. 18, 1916.

Witnesses
L. B. James
C. E. Alger

Inventor
Ira L. Worden

By _____ Attorney

UNITED STATES PATENT OFFICE.

IRA L. WORDEN, OF CARMEN, OKLAHOMA.

HEADER-BARGE ATTACHMENT.

1,168,366.          Specification of Letters Patent.          Patented Jan. 18, 1916.

Application filed April 9, 1915. Serial No. 20,245.

*To all whom it may concern:*

Be it known that I, IRA L. WORDEN, a citizen of the United States, residing at Carmen, in the county of Alfalfa and State of Oklahoma, have invented certain new and useful Improvements in Header-Barge Attachments, of which the following is a specification.

My invention relates to a header barge for farm wagons.

In the harvesting of grain the same is generally delivered from the header harvester to a barge for transportation from the place of harvesting to a suitable place to be stacked. These barges generally have a lower side which is disposed adjacent the harvester elevator so that the wheat or grain may be delivered directly from the header harvester to the barge. Oftentimes the wheat or grain slides off the lower side of the barge and is wasted in the field at the point of loading the barge, that is, before the barge is moved out of coöperation with the header harvester. The barge is generally carried on the body of a farm wagon and as the same is drawn over a field from the header harvester to the place where the grain is stacked much of the grain slides off of the lower side of the barge as the same is transported from the one place to the other and wasted in the field.

It is therefore one object of my invention to provide an attachment which may be easily, economically and readily applied to the lower side of the barge for movement out of the way of the header harvester when the barge is being filled with grain or wheat, and movable into operative position over the top of the lower side of the barge when the latter is withdrawn from the header harvester, so as to prevent accidental dropping of the heads of grain or wheat from the barge as the latter is being transported from the header harvester to the stack, and which, when the place of stacking is reached, may be easily shifted so that all grain or wheat which has been saved from falling out of the barge may be dropped at the stacking place within handy reach of the farmer or other attendant and thereby saved.

Another object resides in the provision of means for connection with the lower side of a header barge to prevent wasting of grain, wheat or feed as the same is carried in the barge from one place to another.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit of the invention or sacrificing any of the advantages thereof.

Figure 2:
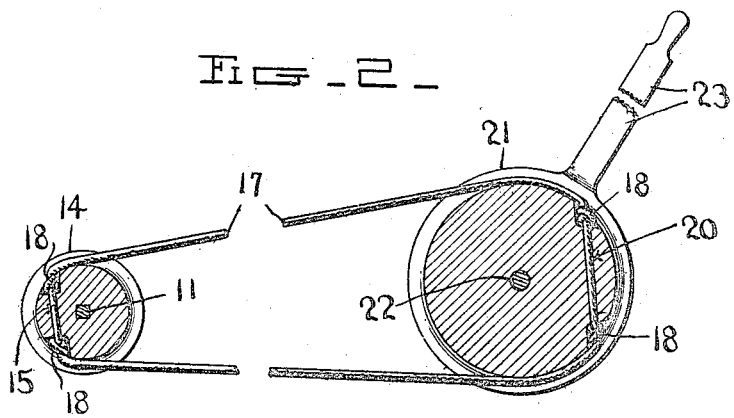

In the drawings: Figure 1 is a perspective view of a grain or feed barge illustrating my invention applied thereto, the dotted lines showing the position of parts when thrown into operative position to prevent accidental wasting of the material placed in the barge. Fig. 2 is a transverse sectional view through the larger sheave.

Referring now more particularly to the accompanying drawings the reference character 10 indicates a barge of any common construction of that type wherein there is a lower side over which the grain or other material is fed into the barge from a header harvester, or otherwise.

My improved attachment embodies a rock shaft 11 which is journaled in suitable bearings 12 along the lower side of the barge, preferably near the upper edge of the lower side thereof. Teeth 13 project from this rock shaft 11 and these teeth are preferably of curved formation, as shown, but not necessarily so.

The shaft 11 preferably projects at one end beyond the side of the barge and this projecting end is provided with a pulley 14 having a perforation 15 to receive the cable 17 which operates over the larger pulley 21 journaled on a stub shaft 22 secured to the end of the barge. The pulley 21 is adapted to be rotated in opposite directions so that the cable 17 between the same and the smaller pulley 14 will effect a backward and forward movement of the rock shaft so as to throw the teeth 13 down as shown in full lines in Fig. 1 to permit the barge to be brought into proper position with relation to the elevator (not shown) of the header harvester (not shown) and so that after the barge has been filled with the material and just prior to transporting the barge from the header harvester to the place of stacking, the shaft may be rocked to throw the teeth to the dotted line position shown in Fig. 1 and thereby prevent the material accidentally falling out over the lower side of the barge during transportation. The cable 17 is passed through perforations 15 and 20 in the pulleys 14 and 21, respectively, and knotted at the end of each perforation, as at 18, the knots being countersunk in the pulleys, as shown. The result is that upon rocking movement of the pulley 21 the cable rocks the smaller pulley 14 which effects corresponding rocking movement of the shaft 11.

The pulley 21 may be rotated in opposite directions through the instrumentality of a lever 23 secured thereto in any suitable manner. This lever has a pawl to engage in the teeth of the segment 24 to lock the pulley against accidental rotation and thereby fasten the rock shaft at either of its limits of rocking movement, or at any angle desired. Any other suitable means for rocking the shaft 11 may be employed and where the particular arrangement shown is employed, it is preferred that a shield 25 be secured to the barge over the smaller pulley 14 to protect the same against contact with the header harvester, barns or the like.

It might be stated that instead of completely lowering the teeth when the stack is reached, that they might be so disposed as to bridge the space between the barge and stack so as to catch the grain or feed that would otherwise fall through the space to the ground, thereby obviating the necessity of cleaning up around the stack, saving time and labor as an additional laborer is usually employed for this purpose. When hauling feed to a barn the teeth may be disposed against the barn under the loft window to prevent falling feed from reaching the ground.

What is claimed is:

1. The combination with a header barge including a lower side, of a rock shaft journaled on the lower side of the barge adjacent the upper edge thereof, teeth carried by the shaft, a pulley on one end of the shaft, a larger pulley journaled on one end of the barge in alinement with the aforesaid pulley, a cable connected to the pulleys, a lever for rotating the larger pulley in opposite directions to thereby rock the shaft and throw the teeth up and down, and means for locking the rock shaft in adjusted positions against rotative movement.

2. The combination with a header barge including a lower side, of a rock shaft journaled on the lower side of the barge exteriorly thereof and adjacent the upper edge thereof, a pulley on one end of the shaft, a larger pulley journaled on one end of the barge in alinement with the aforesaid pulley, a connection between the pulleys, a lever for rotating the larger pulley in opposite directions to thereby rotate the rock shaft pulley accordingly to rock the rock shaft, and means carried by the rock shaft for movement therewith to be positioned down alongside of the lower side of the barge or to be swung upwardly at the lower side of the barge to prevent material in the barge from accidentally falling over the lower side of the barge as the latter is transported from one place to another, and means for locking the rock shaft in adjusted positions against rotative movement.

In testimony whereof I affix my signature.

IRA L. WORDEN.

Copies of this patent may be obtained for five cents each, by addressing the "Commissioner of Patents, Washington, D. C."